(12) United States Patent
DeGeorge et al.

(10) Patent No.: US 9,371,767 B2
(45) Date of Patent: Jun. 21, 2016

(54) SOOT LOAD DETERMINATION SYSTEM

(71) Applicant: Tenneco Automotive Operating Company Inc., Lake Forest, IL (US)

(72) Inventors: John W. DeGeorge, Michigan Center, MI (US); Timothy P. Gardner, Canton, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 347 days.

(21) Appl. No.: 14/032,665

(22) Filed: Sep. 20, 2013

(65) Prior Publication Data

US 2015/0086426 A1 Mar. 26, 2015

(51) Int. Cl.
| | |
|---|---|
| *B01D 50/00* | (2006.01) |
| *F01N 11/00* | (2006.01) |
| *F01N 3/10* | (2006.01) |
| *F01N 3/20* | (2006.01) |
| *F01N 9/00* | (2006.01) |
| *F01N 3/025* | (2006.01) |
| *F01N 3/035* | (2006.01) |
| *F01N 13/00* | (2010.01) |

(52) U.S. Cl.
CPC .............. *F01N 11/007* (2013.01); *F01N 3/025* (2013.01); *F01N 3/035* (2013.01); *F01N 3/103* (2013.01); *F01N 3/208* (2013.01); *F01N 9/002* (2013.01); *F01N 13/009* (2014.06); *F01N 2560/021* (2013.01); *F01N 2560/026* (2013.01); *F01N 2560/06* (2013.01); *Y02T 10/24* (2013.01); *Y02T 10/47* (2013.01)

(58) Field of Classification Search
CPC .... F01N 2560/06; F01N 3/208; F01N 11/007
USPC .................... 60/285, 286, 299, 300; 422/168
See application file for complete search history.

(56) References Cited

U.S. PATENT DOCUMENTS

| | | | |
|---|---|---|---|
| 6,978,604 B2 | 12/2005 | Wang et al. | |
| 8,316,635 B2 | 11/2012 | Zhang et al. | |
| 8,447,461 B2 | 5/2013 | Nevin et al. | |
| 2010/0101213 A1 | 4/2010 | Tuomivaara et al. | |
| 2010/0242447 A1 | 9/2010 | Jasinkiewicz | |
| 2011/0162352 A1 | 7/2011 | Svensson et al. | |
| 2011/0167805 A1* | 7/2011 | Chen ....................... | F01N 3/023 60/286 |
| 2011/0209460 A1 | 9/2011 | He et al. | |
| 2012/0060477 A1 | 3/2012 | Alm et al. | |
| 2012/0083966 A1* | 4/2012 | Nevin ...................... | F01N 9/002 701/29.4 |
| 2012/0204537 A1* | 8/2012 | Dea ........................ | F01N 9/002 60/273 |
| 2012/0204542 A1 | 8/2012 | Norris et al. | |
| 2012/0247085 A1* | 10/2012 | Silver ...................... | F01N 3/035 60/274 |
| 2013/0115150 A1* | 5/2013 | Fritsch .................. | F01N 3/2066 423/212 |
| 2013/0199157 A1 | 8/2013 | Henry et al. | |

* cited by examiner

*Primary Examiner* — Tom P Duong
(74) *Attorney, Agent, or Firm* — Harness, Dickey & Pierce, P.L.C.

(57) ABSTRACT

An aftertreatment system for treating exhaust gas discharged from a combustion engine may include a particulate filter, a reductant-injection system, an ammonia sensor and a control module. The particulate filter may be configured to filter exhaust gas discharged from the combustion engine. The reductant-injection system may be configured to inject a reductant into a stream of the exhaust gas upstream of the particulate filter. The ammonia sensor may be configured to sense a concentration of ammonia in the stream of exhaust gas downstream of the particulate filter. The control module may be in communication with the ammonia sensor and may determine a soot load of the particulate filter based on data received from the ammonia sensor.

7 Claims, 2 Drawing Sheets

SOOT LOAD DETERMINATION SYSTEM

FIELD

Figure 1:
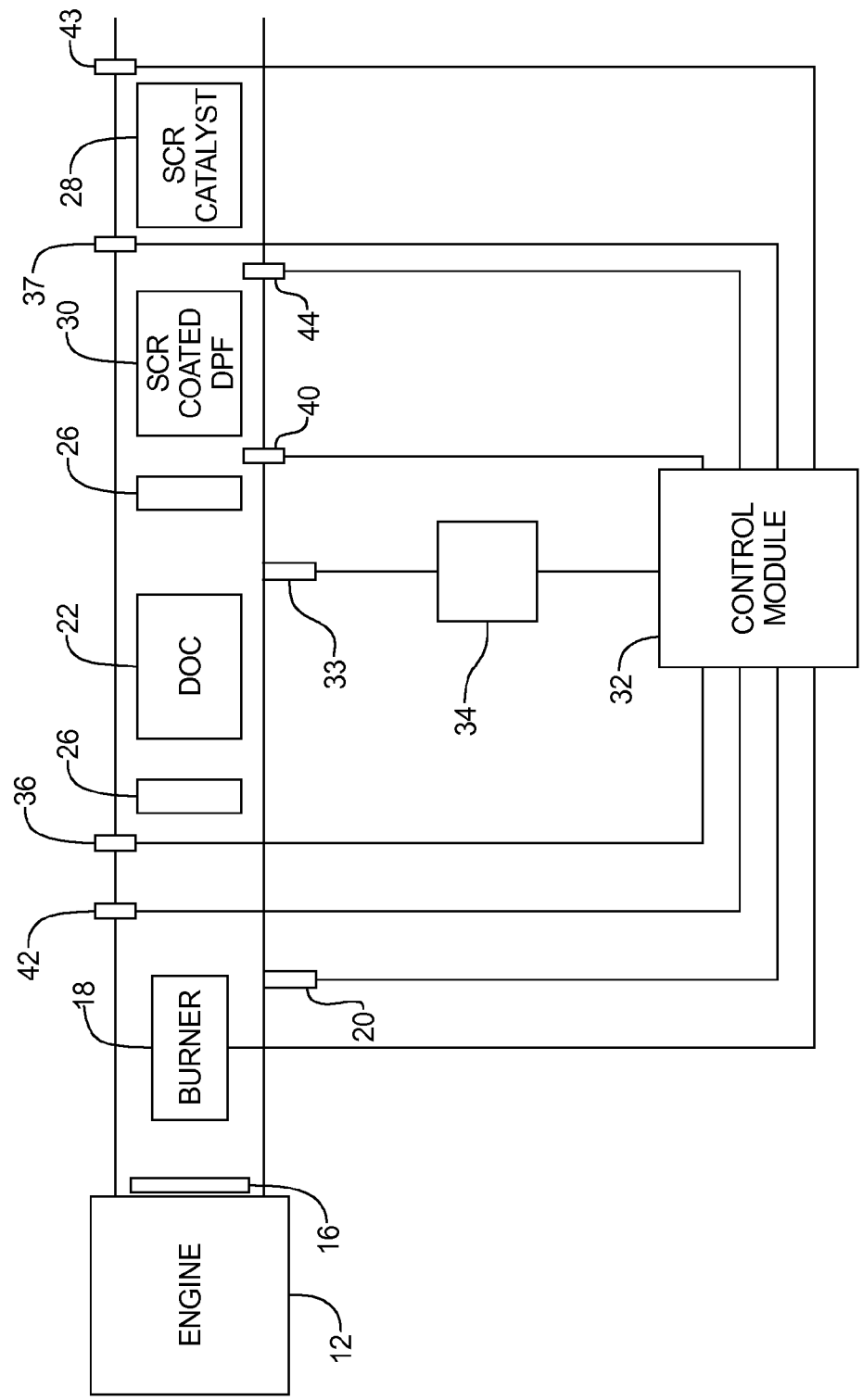

The present disclosure relates to a soot load determination system for an aftertreatment system of a combustion engine.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodic regeneration or oxidation of the trapped soot in the DPF is required for proper operation. To regenerate the DPF, relatively high exhaust temperatures in combination with an ample amount of oxygen in the exhaust stream may be needed to oxidize the soot trapped in the filter.

The DOC is typically used to generate heat to regenerate the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration may not passively occur. Furthermore, $NO_x$ adsorbers and selective catalytic reduction systems typically require a minimum exhaust temperature to properly operate. Therefore, a burner may be provided to heat the exhaust stream upstream of the various aftertreatment devices to a suitable temperature to facilitate regeneration and efficient operation of the aftertreatment devices.

DPF regeneration (e.g., hydrocarbon dosing and/or burner ignition) may be triggered when the system determines that a predetermined amount of soot has accumulated on the DPF. While aftertreatment systems have included soot load determination systems in the past, it may be desirable to provide an improved soot load determination system that accurately determines the soot load of the DPF over a wide range of engine operating conditions.

SUMMARY

This section provides a general summary of the disclosure, and is not a comprehensive disclosure of its full scope or all of its features.

In one form, the present disclosure provides an aftertreatment system for treating exhaust gas discharged from a combustion engine. The aftertreatment system may include a particulate filter, a reductant-injection system, an ammonia sensor and a control module. The particulate filter may be configured to filter exhaust gas discharged from the combustion engine. The reductant-injection system may be configured to inject a reductant into a stream of the exhaust gas upstream of the particulate filter. The ammonia sensor may be configured to sense a concentration of ammonia in the stream of exhaust gas downstream of the particulate filter. The control module may be in communication with the ammonia sensor and may determine a soot load of the particulate filter based on data received from the ammonia sensor.

In some embodiments, the aftertreatment system may include a $NO_x$ sensor in communication with the control module and configured to sense a concentration of $NO_x$ in the stream of exhaust gas.

In some embodiments, the control module may determine the soot load of the particulate filter based on data received from the $NO_x$ sensor.

In some embodiments, the $NO_x$ sensor may be positioned to determine a concentration of $NO_x$ at an inlet of the particulate filter or upstream of the particulate filter.

In some embodiments, the control module may determine the soot load of the particulate filter based on a ratio of ammonia to $NO_x$.

In some embodiments, the aftertreatment system may include a regeneration device disposed upstream of the particulate filter and in communication with the control module. The control module may activate the regeneration device in response to the control module determining that the soot load of the particulate filter is above a predetermined threshold. The regeneration device may include a hydrocarbon injector and/or a burner.

In some embodiments, the control module may be in communication with the reductant-injection system and may control an amount of reductant injected into the stream of exhaust gas to achieve a desired ammonia concentration downstream of the particulate filter.

In some embodiments, the control module may determine a ratio of ammonia to $NO_x$ based on the desired ammonia concentration and a concentration of $NO_x$ sensed upstream of the particulate filter. The control module may determine the soot load of the particulate filter based on the ratio.

In some embodiments, the control module may determine the soot load of the particulate filter based on an actual ammonia slip value relative to an expected ammonia slip value.

In some embodiments, the particulate filter may include a selective catalytic reduction coating.

In another form, the present disclosure provides a soot load determination system for a particulate filter of an aftertreatment system of a combustion engine. The soot load determination system may include an ammonia sensor and a control module. The ammonia sensor may be configured to sense a concentration of ammonia in exhaust gas downstream of the particulate filter. The control module may be in communication with the ammonia sensor and may determine a soot load of the particulate filter based on data received from the ammonia sensor.

In some embodiments, the soot load determination system may include a $NO_x$ sensor in communication with the control module and configured to sense a concentration of $NO_x$ in the exhaust gas.

In some embodiments, the control module may determine the soot load of the particulate filter based on data received from the $NO_x$ sensor.

In some embodiments, the $NO_x$ sensor may be positioned to determine a concentration of $NO_x$ at an inlet of the particulate filter or upstream of the particulate filter.

In some embodiments, the control module may determine the soot load of the particulate filter based on a ratio of ammonia to $NO_x$.

In some embodiments, the soot load determination system may include a regeneration device disposed upstream of the particulate filter and in communication with the control module. The control module may activate the regeneration device in response to the control module determining that the soot load of the particulate filter is above a predetermined threshold. The regeneration device may include a hydrocarbon injector and/or a burner.

In some embodiments, the control module may be in communication with a reductant-injection system and may control an amount of reductant injected into the exhaust gas to achieve a desired ammonia concentration downstream of the particulate filter.

In some embodiments, the control module may determine a ratio of ammonia to $NO_x$ based on the desired ammonia concentration and a concentration of $NO_x$ sensed upstream of the particulate filter. The control module may determine the soot load of the particulate filter based on the ratio.

In some embodiments, the control module may determine the soot load of the particulate filter based on an actual ammonia slip value relative to an expected ammonia slip value.

In some embodiments, the particulate filter may include a selective catalytic reduction coating.

In another form, the present disclosure provides a method for determining a soot load of a diesel particulate filter of an aftertreatment system for a combustion engine. The method may include receiving data from an ammonia sensor indicative of an amount of ammonia in a stream of exhaust gas downstream of the diesel particulate filter; determining an amount of $NO_x$ in the stream of exhaust gas downstream of the diesel particulate filter; determining a ratio of ammonia to $NO_x$ based on the data received from the $NO_x$ sensor and the ammonia sensor; and determining a soot load of the diesel particulate filter based on the ratio.

In some embodiments, the method may also include controlling a regeneration device disposed in the exhaust stream upstream of the diesel particulate filter based on the soot load.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
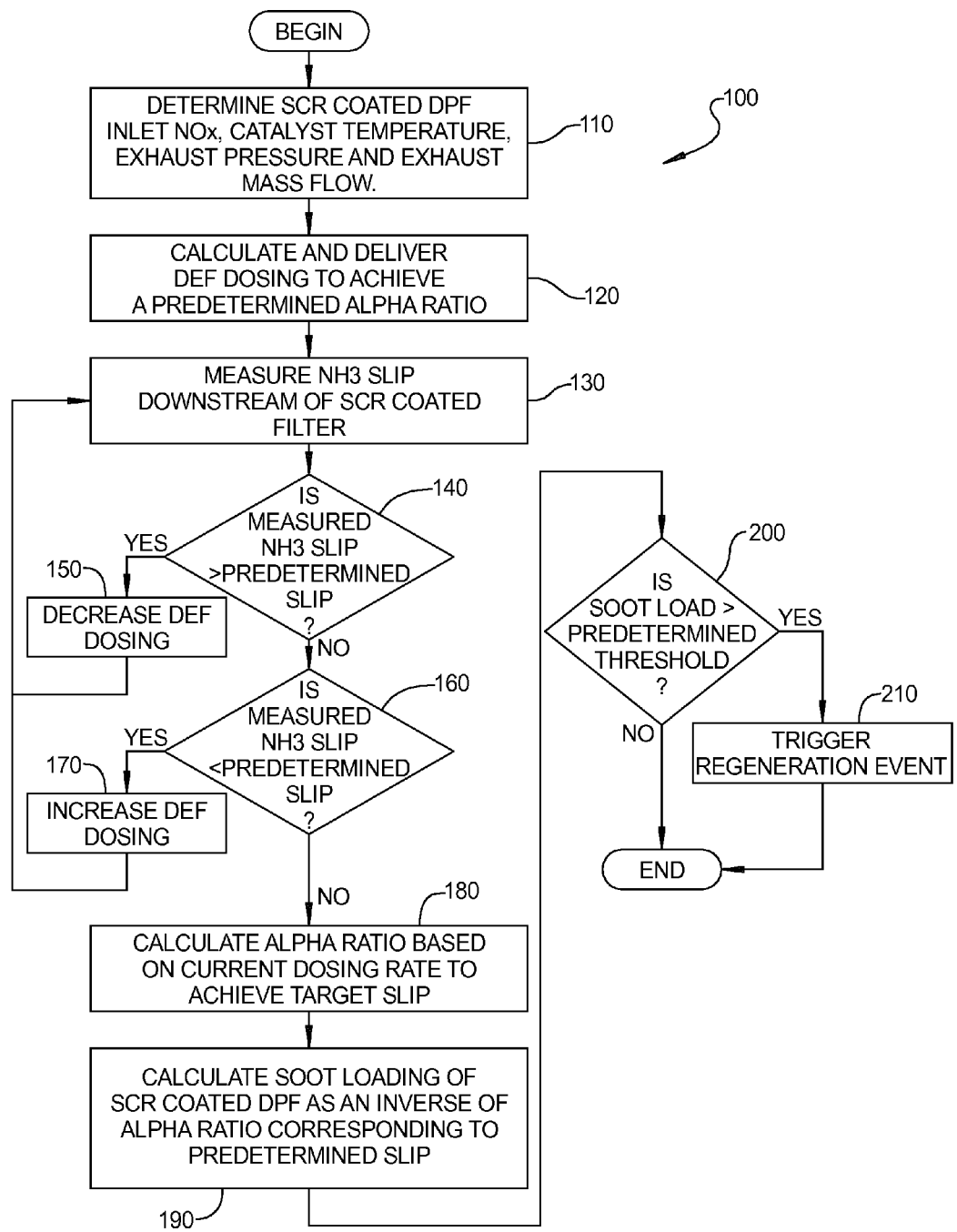

FIG. 1 is a schematic representation of an engine and an exhaust aftertreatment system having a soot load determination system according to the principles of the present disclosure; and FIG. 2 is a flow chart illustrating a method of determining a soot load of a particulate filter of the aftertreatment system.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 depicts an exhaust gas aftertreatment system 10 for treating the exhaust output from an exemplary engine 12 to an exhaust passageway 14. A turbocharger 16 includes a driven member (not shown) positioned in an exhaust stream. During engine operation, the exhaust stream causes the driven member to rotate and provide compressed air to an intake passage (not shown) of the engine 12. It will be appreciated that the exhaust gas aftertreatment system 10 can also be used to treat exhaust output from a naturally aspirated engine or any other engine that does not include a turbocharger.

The exhaust aftertreatment system 10 may include a burner 18, a hydrocarbon injector 20, a diesel oxidation catalyst (DOC) 22, a diesel exhaust fluid (DEF) dosing system 24, one or more mixers 26, an SCR catalyst 28, a diesel particulate filter (DPF) 30, and a control module 32. The DPF 30 may be an SCR coated diesel particulate filter and may filter soot (i.e., diesel particulates) from the exhaust gas stream to reduce emission of particulate matter (PM) into the ambient environment. Over time, soot may accumulate on the DPF 30, which may hinder performance of the engine 12, the DPF 30 and/or other components of the exhaust aftertreatment system 10.

The hydrocarbon injector 20 may spray hydrocarbons over the DOC 22, which may generate heat to regenerate (i.e., remove soot from) the DPF 30, as described above. The burner 18 may be positioned downstream from the turbocharger 16 and upstream from the DOC 22 and may be selectively operated to heat exhaust gas in the exhaust passageway 14 to a predetermined temperature to facilitate the heat-generating reaction at the DOC 22.

The DEF dosing system 24 may include an injector 33 and a reductant tank 34. The injector 33 may inject a reductant (e.g., urea) from the reductant tank 34 into the exhaust stream upstream of the SCR catalyst 28. The mixers 26 may mix the injected reductant with the exhaust gas before the reductant reaches the SCR catalyst 28. The SCR catalyst 28 may convert nitrogen oxides ($NO_x$) in the exhaust gas into diatomic nitrogen ($N_2$), water and/or carbon dioxide ($CO_2$).

The control module 32 may include or be part of an Application Specific Integrated Circuit (ASIC), an electronic circuit, a processor (shared, dedicated or group) and/or memory (shared, dedicated or group) that execute one or more software or firmware programs, and/or a combinational logic circuit, for example, and/or other suitable components that provide the described functionality. The control module 32 may be a part of or include a control unit controlling one or more other vehicle systems. Alternatively, the control module 32 may be a control unit dedicated to the exhaust aftertreatment system 10.

The control module 32 may be in communication with a control operation of the burner 18, the hydrocarbon injector 20 (and/or a first pump that forces the hydrocarbon through the hydrocarbon injector 20), and/or the DEF dosing system 24 (e.g., a second pump that forces reductant through the injector 33). The control module 32 may also be in communication with first and second temperature sensors 36, 37, an exhaust pressure sensor 40, first and second $NO_x$ sensors 42, 43, and an ammonia sensor 44. The first temperature sensor may measure a temperature at or near the DOC 22. The second temperature sensor 37 may measure a temperature at or near the SCR catalyst 28. An exhaust mass flow sensor (not shown) may measure a mass flow of the exhaust gas stream flowing through the exhaust passageway 14 between the SCR catalyst 28 and the DPF 30. Alternatively, this mass flow value may be calculated based on engine speed and/or other engine operating parameters or determined from an engine control system. The exhaust pressure sensor 40 may measure a pressure of the exhaust gas stream between the DOC 22 and the DPF 30. The first $NO_x$ sensor 42 may measure an amount of $NO_x$ in the exhaust stream at or near an inlet of the DOC 22. The second $NO_x$ sensor 43 may measure an amount of $NO_x$ in the exhaust stream at or near an outlet of the SCR catalyst 28.

The ammonia sensor 44 may measure an amount of ammonia in the exhaust stream at an outlet of the DPF 30 or downstream of the DPF 30. The control module 32 may control operation of the DEF dosing system 24 and determine a soot load of the DPF 30 based on the exhaust mass flow and data received from the first and second temperature sensors 36, 37, the exhaust pressure sensor 40, the first and second $NO_x$ sensors 42, 43, and/or the ammonia sensor 44.

Referring now to FIGS. 1 and 2, a method 100 of control operation of the DEF dosing system 24 and determining the soot load of the DPF 30 is provided. At step 110, the control module 32 may determine the temperature of the SCR catalyst 28, the mass flow of the exhaust gas stream flowing through the exhaust passageway 14 between the SCR catalyst 28 and the DPF 30, the pressure of the exhaust gas stream between the SCR catalyst 28 and the DPF 30, and the amount of $NO_x$ in the exhaust stream at or upstream of an inlet of the DPF 30. These parameters may be measured by the sensors 37, 40, 42 and/or calculated based on one or more operating parameters of the engine 12 and/or aftertreatment system 10, for example.

At step 120, the control module 32 may calculate an initial dosing rate of the DEF dosing system 24 that will achieve a predetermined alpha ratio (i.e., a predetermined ratio of ammonia to $NO_x$ in the exhaust stream). In some embodiments, the predetermined alpha ratio could be 1, for example. The dosing rate may be determined based on the exhaust mass flow rate and data received from the sensors 40, 42 at step 110. It will be appreciated that the dosing rate can be determined based on one or more parameters in addition to or instead of the predetermined alpha ratio. After determining the initial dosing rate, the control module 32 may cause the DEF dosing system 24 to inject reductant into the exhaust stream at the initial dosing rate.

At step 130, the control module 32 may determine an ammonia slip value (i.e., an amount of unreacted ammonia downstream of the DPF 30). The ammonia slip value can be a measured value received from the ammonia sensor 44. Then, at step 140, the control module 32 may determine whether the measured ammonia slip value is greater than a predetermined or expected ammonia slip value. If the measured ammonia slip value is greater than the predetermined value, the control module 32 may, at step 150, decrease the dosing rate of the DEF dosing system 24. After decreasing the dosing rate, the control module 32 may acquire an updated ammonia slip measurement from the ammonia sensor 44 at step 130. Thereafter, at step 140, the control module 32 may determine whether the updated ammonia slip value is greater than the predetermined value. If the control module 32 determines that the updated ammonia slip value is not greater than the predetermined value, the control module 32 may determine if the updated ammonia slip value is less than the predetermined value at step 160. If the updated ammonia slip value is less than the predetermined value, the control module 32 may increase the dosing rate of the DEF dosing system 24 at step 170, and then repeat steps 130, 140, 150, 160 and 170, as necessary. It will be appreciated that the control module 32 could perform step 160 prior to step 140 or the control module 32 could perform steps 140 and 160 substantially simultaneously and adjust the dosing rate until the ammonia slip value measured by the ammonia sensor 44 is equal to or approximately equal to the predetermined value.

Once the dosing rate has been set to achieve the desired ammonia slip, the control module 32 may, at step 180, calculate the alpha ratio based on that dosing rate. At step 190, the control module 32 may determine a soot load of the DPF 30 based on the alpha ratio calculated at step 180 (i.e., the alpha ratio corresponding to the dosing rate that yields the desired ammonia slip value at ammonia sensor 44). The soot load may be inversely related to the alpha ratio calculated at step 180. The control module 32 may determine the soot load from a look-up table stored in a memory of the control module 32. The values stored in the look-up table can be determined through experimentation. It can be shown that the soot load value for a given DPF changes in relation to a difference between the alpha ratio calculated at step 180 and the predetermined alpha ratio.

In some embodiments, weighting factors could be applied to the soot load value determined at step 190 and the calculated soot load values could be integrated over time to account for signal noise and filter aging. The weighting factors could correspond to a time since a last DPF regeneration event and an age of the SCR catalyst 28 or DPF 30, for example.

After determining the soot load of the DPF 30, the control module 32 may, at step 200, determine if the soot load is greater than a predetermined threshold. If the control module 32 determines that the soot load on the DPF 30 is greater than the predetermined threshold, the control module 32 may, at step 210, trigger a regeneration event. The predetermined threshold may be selected to achieve a desired level of performance of the DPF 30, the engine 12 and/or any other one or more components of the exhaust aftertreatment system 10. During a regeneration event, the control module 32 may cause the hydrocarbon injector 20 to spray hydrocarbon into the exhaust stream upstream of the DOC 22 and/or the control module 32 may cause the burner 18 to ignite to facilitate regeneration of the DPF 30, as described above. It will be appreciated that some or all of the method 100 may be repeated continuously or intermittently.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system for treating exhaust gas discharged from a combustion engine, the aftertreatment system comprising:
   a particulate filter configured to filter exhaust gas discharged from the combustion engine;
   a reductant-injection system configured to inject a reductant into a stream of the exhaust gas upstream of the particulate filter;
   an ammonia sensor configured to sense a concentration of ammonia in the stream of exhaust gas downstream of the particulate filter;
   a $NO_x$ sensor configured to sense a concentration of $NO_x$ in the stream of exhaust gas upstream of the particulate filter; and
   a control module in communication with the ammonia sensor and the $NO_x$ sensor, wherein the control module is in communication with the reductant-injection system and adjusts an amount of reductant injected into the stream of exhaust gas to achieve a desired ammonia concentration downstream of the filter, the control module determining a concentration of $NO_x$ sensed upstream of the particulate filter after the adjusted amount of injected reductant produces the desired ammonia concentration, wherein the control module determines the soot load of the particulate filter based on the data received from the ammonia sensor and the $NO_x$ sensor; wherein the control module controls the reductant-injection system to adjust a dosing ratio of injected reductant until an actual ammonia slip value is within a predetermined range of a predetermined value; and wherein the control module calculates an alpha ratio based on the dosing rate of injected reductant and determines a soot load based on the alpha ratio.

2. The aftertreatment system of claim 1, further comprising a regeneration device disposed upstream of the particulate filter and in communication with the control module, and wherein the control module activates the regeneration device in response to the control module determining that the soot load of the particulate filter is above a predetermined threshold.

3. The aftertreatment system of claim 2, wherein the regeneration device includes a hydrocarbon injector or a burner or the hydrocarbon injector and the burner.

4. The aftertreatment system of claim 1, wherein the control module determines the soot load of the particulate filter based on an actual ammonia slip value relative to an expected ammonia slip value.

5. The aftertreatment system of claim 1, wherein the particulate filter includes a selective catalytic reduction coating.

6. The aftertreatment system of claim 1, wherein the control module determines the soot load from a look-up table stored in a memory of the control module.

7. The aftertreatment system of claim 1, wherein the control module applies a weighting factor to the soot load based on a time since a last filter regeneration event or an age of the particulate filter.

* * * * *